United States Patent
Waller et al.

(10) Patent No.: US 10,907,764 B2
(45) Date of Patent: Feb. 2, 2021

(54) INDUSTRIAL VEHICLE LAYOVER SYSTEM

(71) Applicant: Crown Equipment Corporation, New Bremen, OH (US)

(72) Inventors: Amos Kent Waller, Greenville, OH (US); Kevin Ranly, Minster, OH (US); Neal A. Hittepole, Troy, OH (US); Sheldon R. Houseworth, Eaton, OH (US)

(73) Assignee: Crown Equipment Corporation, New Bremen, OH (US)

( * ) Notice: Subject to any disclaimer, the term of this patent is extended or adjusted under 35 U.S.C. 154(b) by 8 days.

(21) Appl. No.: 16/178,748

(22) Filed: Nov. 2, 2018

(65) Prior Publication Data

US 2019/0135600 A1 May 9, 2019

Related U.S. Application Data

(60) Provisional application No. 62/581,817, filed on Nov. 6, 2017.

(51) Int. Cl.
*F16M 11/42* (2006.01)
*B66F 9/06* (2006.01)
(Continued)

(52) U.S. Cl.
CPC ............. *F16M 11/42* (2013.01); *B66F 9/063* (2013.01); *B66F 9/07504* (2013.01);
(Continued)

(58) Field of Classification Search
CPC .... B66F 9/07504; B66F 9/075; B62B 5/0083; F16M 11/42; F16M 3/00
See application file for complete search history.

(56) References Cited

U.S. PATENT DOCUMENTS 605,162 A * 6/1898 Deane .................. B62B 5/0083
280/47.131
1,591,719 A * 7/1926 Merrifield .............. B62B 1/002
187/241
(Continued)

FOREIGN PATENT DOCUMENTS

| CH | 654279 A5 | 2/1986 | |
|---|---|---|---|
| DE | 102018112568 A1 * | 11/2019 | ................ B60P 1/00 |
| EP | 0855330 A1 | 7/1998 | |

OTHER PUBLICATIONS

Sheppard, Bruce; International Search Report and Written Opinion of the International Searching Authority; International Application No. PCT/US2018/058863; dated Feb. 5, 2019; European Patent Office; Rijswijk, Netherlands.

*Primary Examiner* — Eret C McNichols
(74) *Attorney, Agent, or Firm* — Stevens & Showalter LLP

(57) ABSTRACT

A layover bracket system is disclosed for supporting an industrial vehicle in a horizontal position. The layover bracket system includes a layover bracket removably coupled to a proximal end portion of the industrial vehicle, the layover bracket including at least one wheel for moving the layover bracket system with the industrial vehicle supported thereon while the industrial vehicle is in the horizontal position. The layover bracket supports the proximal end portion of the industrial vehicle when the industrial vehicle is in a horizontal position and allows the layover bracket system and industrial vehicle to roll on the at least one wheel of the layover bracket. The layover bracket system may also include a support bracket for supporting a distal end of the industrial vehicle while the vehicle is in the horizontal position.

30 Claims, 13 Drawing Sheets

(51) Int. Cl.
  *B66F 9/075* (2006.01)
  *B60P 3/06* (2006.01)
  *F16M 3/00* (2006.01)

(52) U.S. Cl.
  CPC ......... *B60P 3/064* (2013.01); *B66F 2700/123* (2013.01); *F16M 3/00* (2013.01)

(56) References Cited

U.S. PATENT DOCUMENTS

| | | | | |
|---|---|---|---|---|
| 1,604,723 | A * | 10/1926 | Rutherford | B62B 5/0086 280/47.131 |
| 3,052,323 | A * | 9/1962 | Hopfeld | B62B 1/14 187/232 |
| 3,385,401 | A * | 5/1968 | Campbell | B66B 9/16 187/222 |
| 3,512,663 | A * | 5/1970 | Guerrico | B62B 1/14 414/373 |
| 3,533,640 | A * | 10/1970 | Fator | B62B 5/0083 280/35 |
| 3,809,261 | A * | 5/1974 | Lee | B62B 5/0089 414/373 |
| 4,098,518 | A * | 7/1978 | Minkoff | B62B 5/0083 280/47.131 |
| 4,465,421 | A * | 8/1984 | Murillo | B66F 7/246 280/79.4 |
| 4,784,402 | A * | 11/1988 | Roman | B25H 5/00 280/79.4 |
| 4,863,334 | A * | 9/1989 | Girerd | B62B 5/0086 414/458 |
| 8,505,691 | B2 | 8/2013 | Smeeton et al. | |
| 8,919,476 | B2 * | 12/2014 | Holland | B62D 1/00 180/167 |
| 9,014,836 | B2 * | 4/2015 | Stone | B64F 5/50 700/114 |
| 9,090,357 | B2 * | 7/2015 | Oberoi | B64C 1/18 |
| 9,751,546 | B2 * | 9/2017 | Spruth | B62B 1/262 |
| 10,093,368 | B2 * | 10/2018 | Black | B60B 30/02 |
| 10,427,254 | B2 * | 10/2019 | Day | B64F 5/10 |
| 2001/0045718 | A1 * | 11/2001 | Boirum | E04G 5/00 280/47.26 |
| 2005/0212243 | A1 * | 9/2005 | Terry | B62B 5/0083 280/79.11 |
| 2006/0108470 | A1 * | 5/2006 | McCrary | B62D 55/065 244/50 |
| 2007/0036627 | A1 * | 2/2007 | Wright | B64F 5/50 410/49 |
| 2008/0205763 | A1 * | 8/2008 | Marsh | B64F 5/10 382/190 |
| 2009/0139803 | A1 * | 6/2009 | Smeeton | B66F 9/07504 187/408 |
| 2009/0142174 | A1 * | 6/2009 | Fischer | B66F 9/082 414/636 |
| 2011/0297905 | A1 * | 12/2011 | Arensdorf | B66F 3/08 254/8 R |
| 2014/0115860 | A1 * | 5/2014 | Sarh | B23P 19/06 29/428 |
| 2015/0314889 | A1 * | 11/2015 | Day | B23B 41/00 408/1 R |
| 2015/0314890 | A1 * | 11/2015 | Desjardien | B25J 11/007 212/324 |
| 2015/0314892 | A1 * | 11/2015 | Desjardien | B64F 5/50 29/559 |
| 2016/0011593 | A1 * | 1/2016 | Oberoi | B60G 3/145 701/23 |
| 2017/0158476 | A1 * | 6/2017 | Brunckhorst | B66F 9/07504 |
| 2017/0308084 | A1 * | 10/2017 | Spicer | G05D 1/0088 |

* cited by examiner

INDUSTRIAL VEHICLE LAYOVER SYSTEM

CROSS REFERENCE TO RELATED APPLICATIONS

This application claims the benefit of U.S. Provisional Patent Application Ser. No. 62/581,817, filed Nov. 6, 2017, entitled "INDUSTRIAL VEHICLE LAYOVER SYSTEM," the entire disclosure of which is hereby incorporated by reference herein.

FIELD OF THE INVENTION

The present invention relates to a system for facilitating transport of an industrial vehicle.

BACKGROUND OF THE INVENTION

From time to time it is necessary to transport industrial vehicles from one facility to another, e.g., after a sale of the vehicle or to service the vehicle. Shipping of industrial vehicles tends to be difficult, as the vehicles oftentimes need to be laid over on their sides for transport, due to their heights.

BRIEF SUMMARY OF THE INVENTION

In accordance with a first aspect of the present invention, a layover bracket system is provided for supporting an industrial vehicle in a horizontal position. The system comprises a support bracket removably coupled to a distal end portion of the industrial vehicle, the support bracket including at least one wheel for moving the layover bracket system with the industrial vehicle supported thereon while the industrial vehicle is in a horizontal position. The system further comprises a layover bracket, separate from the support bracket, the layover bracket removably coupled to a proximal end portion of the industrial vehicle, the layover bracket including at least one wheel for moving the layover bracket system with the industrial vehicle supported thereon while the industrial vehicle is in the horizontal position. The support and layover brackets support the distal and proximal end portions of the industrial vehicle, respectively, when the industrial vehicle is in a horizontal position and allow the layover bracket system and industrial vehicle to roll on the at least one wheel of the support and layover brackets.

The system may include a load handling assembly, a front side facing away from the load handling assembly, a back side opposite to the front side, a left side between the front and back sides, and a right side between the front and back sides and opposite to the left side. The support bracket may be removably coupled to the industrial vehicle distal end at one of the left or right sides thereof, such that the one of the left or right sides of the industrial vehicle faces the floor surface when the industrial vehicle is supported on the layover bracket system. The distal end portion may be defined on a mast assembly of the industrial vehicle.

The support bracket may include a pair of fork pockets for receiving forks of a materials handling vehicle that are provided to move the industrial vehicle on the layover bracket system.

The system may further include a first component removably coupled to the industrial vehicle distal end portion and a second component that releasably secures the first component to the second component. The second component may include a rotatable member that rotates relative to a base portion of the support bracket, and an aperture for receiving the first component, wherein a lip of the second component that opens to the aperture defines an angled surface.

The layover bracket may be removably coupled to a skirt extending at least partially around a power unit of the industrial vehicle. The industrial vehicle may include a load handling assembly, a front side facing away from the load handling assembly, a back side opposite to the front side, a left side between the front and back sides, and a right side between the front and back sides and opposite to the left side. The layover bracket may be removably coupled to the skirt at one of the left or right sides of the industrial vehicle, such that the one of the left or right sides of the industrial vehicle faces the floor surface when the industrial vehicle is supported on the layover bracket system.

The layover bracket may be removably coupled to a skirt extending at least partially around a power unit of the industrial vehicle, and an outrigger extending alongside an operator compartment of the industrial vehicle.

The layover bracket may include a curved ramp surface facing away from the industrial vehicle when the layover bracket is coupled to the industrial vehicle, and when the industrial vehicle is moved from a vertical position to the horizontal position, the curved ramp surface provides a pivoting surface on the floor surface. Opposed first and second side end portions of the layover bracket may each include a curved ramp surface, wherein the curved ramp surface of both of the first and second side end portions provide a pivoting surface on the floor surface when the industrial vehicle is moved from a vertical position to the horizontal position.

The layover bracket may be coupled to the proximal end portion of the industrial vehicle such that the layover bracket does not contact the floor surface while the industrial vehicle is in a vertical position.

The support bracket may include a tow mechanism.

The layover bracket may include at least one retention member for militating against sliding movement of the layover bracket system and the vehicle on the floor surface when the vehicle is engaged with the layover bracket and is in an upright position.

The layover bracket may further include an adjustment mechanism for moving the at least one wheel between a ground-engaging position and a retracted position, wherein while the at least one wheel is in the ground engaging position, the at least one wheel contacts the floor surface while the vehicle is supported on the layover bracket and is in the horizontal position. Further, while the at least one wheel is in the retracted position, the at least one retention member contacts the floor surface while the vehicle is engaged with the layover bracket and is in the upright position, but the at least one wheel does not contact the floor surface while the vehicle is engaged with the layover bracket and is in the upright position.

In accordance with a second aspect of the present invention, a layover bracket system is provided for supporting an industrial vehicle in a horizontal position. The system comprises a bracket removably coupled to a proximal end portion of the industrial vehicle, the proximal end portion located proximate to the floor surface when the industrial vehicle is in a vertical position. The bracket comprises at least one wheel for moving the layover bracket system with the industrial vehicle supported thereon while the industrial vehicle is in a horizontal position, and a curved ramp surface facing away from the industrial vehicle when the bracket is coupled to the industrial vehicle. When the industrial vehicle is moved from the vertical position to the horizontal position, the curved ramp surface provides a pivoting surface on the floor surface, and the bracket supports the proximal end portion of the industrial vehicle when the industrial vehicle is in the horizontal position and allows the layover bracket system and industrial vehicle to roll on the at least one wheel of the bracket.

The bracket may be removably coupled to a skirt extending at least partially around a power unit of the industrial vehicle. The industrial vehicle may include a load handling assembly, a front side facing away from the load handling assembly, a back side opposite to the front side, a left side between the front and back sides, and a right side between the front and back sides and opposite to the left side. The bracket may be removably coupled to the skirt at one of the left or right sides of the industrial vehicle, such that the one of the left or right sides of the industrial vehicle faces the floor surface when the industrial vehicle is supported on the layover bracket system.

The bracket may be removably coupled to a skirt extending at least partially around a power unit of the industrial vehicle, and an outrigger extending alongside an operator compartment of the industrial vehicle.

Opposed first and second side end portions of the bracket may each include a curved ramp surface, wherein the curved ramp surface of both of the first and second side end portions provide a pivoting surface on the floor surface when the industrial vehicle is moved from a vertical position to the horizontal position.

The bracket may be coupled to the proximal end portion of the industrial vehicle such that the bracket does not contact the floor surface while the industrial vehicle is in a vertical position.

The bracket may include at least one retention member for militating against sliding movement of the layover bracket system and the vehicle on the floor surface when the vehicle is engaged with the bracket and is in an upright position.

The bracket may further include an adjustment mechanism for moving the at least one wheel between a ground-engaging position and a retracted position, wherein while the at least one wheel is in the ground engaging position, the at least one wheel contacts the floor surface while the vehicle is supported on the bracket and is in the horizontal position. Further, while the at least one wheel is in the retracted position, the at least one retention member contacts the floor surface while the vehicle is engaged with the bracket and is in the upright position, but the at least one wheel does not contact the floor surface while the vehicle is engaged with the bracket and is in the upright position.

In accordance with a third aspect of the present invention, a layover bracket system is provided for supporting an industrial vehicle in a horizontal position, the industrial vehicle including a load handling assembly, a front side facing away from the load handling assembly, a back side opposite to the front side, a left side between the front and back sides, and a right side between the front and back sides and opposite to the left side. The layover bracket system comprises a bracket removably coupled to a proximal end portion of the industrial vehicle at one of the left or right sides thereof, the bracket comprising at least one wheel for moving the layover bracket system with the industrial vehicle supported thereon while the industrial vehicle is in a horizontal position. The bracket supports the proximal end portion of the industrial vehicle when the industrial vehicle is in the horizontal position such that the one of the left or right sides of the industrial vehicle faces the floor surface when the industrial vehicle is supported on the layover bracket system and allows the layover bracket system and industrial vehicle to roll on the at least one wheel of the bracket.

The bracket may be removably coupled to a skirt extending at least partially around a power unit of the industrial vehicle. The industrial vehicle may include a load handling assembly, a front side facing away from the load handling assembly, a back side opposite to the front side, a left side between the front and back sides, and a right side between the front and back sides and opposite to the left side. The bracket may be removably coupled to the skirt at one of the left or right sides of the industrial vehicle, such that the one of the left or right sides of the industrial vehicle faces the floor surface when the industrial vehicle is supported on the layover bracket system.

The layover bracket may be removably coupled to a skirt extending at least partially around a power unit of the industrial vehicle, and an outrigger extending alongside an operator compartment of the industrial vehicle.

Opposed first and second side end portions of the bracket may each include a curved ramp surface, wherein the curved ramp surface of both of the first and second side end portions provide a pivoting surface on the floor surface when the industrial vehicle is moved from a vertical position to the horizontal position.

The bracket may include at least one retention member for militating against sliding movement of the layover bracket system and the vehicle on the floor surface when the vehicle is engaged with the bracket and is in an upright position.

The bracket may further include an adjustment mechanism for moving the at least one wheel between a ground-engaging position and a retracted position, wherein while the at least one wheel is in the ground engaging position, the at least one wheel contacts the floor surface while the vehicle is supported on the bracket and is in the horizontal position. Further, while the at least one wheel is in the retracted position, the at least one retention member contacts the floor surface while the vehicle is engaged with the bracket and is in the upright position, but the at least one wheel does not contact the floor surface while the vehicle is engaged with the bracket and is in the upright position

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

DETAILED DESCRIPTION

The following text sets forth a broad description of numerous different embodiments of the present disclosure. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. It should be understood that multiple combinations of the embodiments described and shown are contemplated and that a particular focus on one embodiment does not preclude its inclusion in a combination of other described embodiments. Numerous alternative embodiments could be implemented, using either current technology or technology developed after the filing date of this patent, which would still fall within the scope of the claims. All publications and patents cited herein are incorporated herein by reference.

Figure 1:
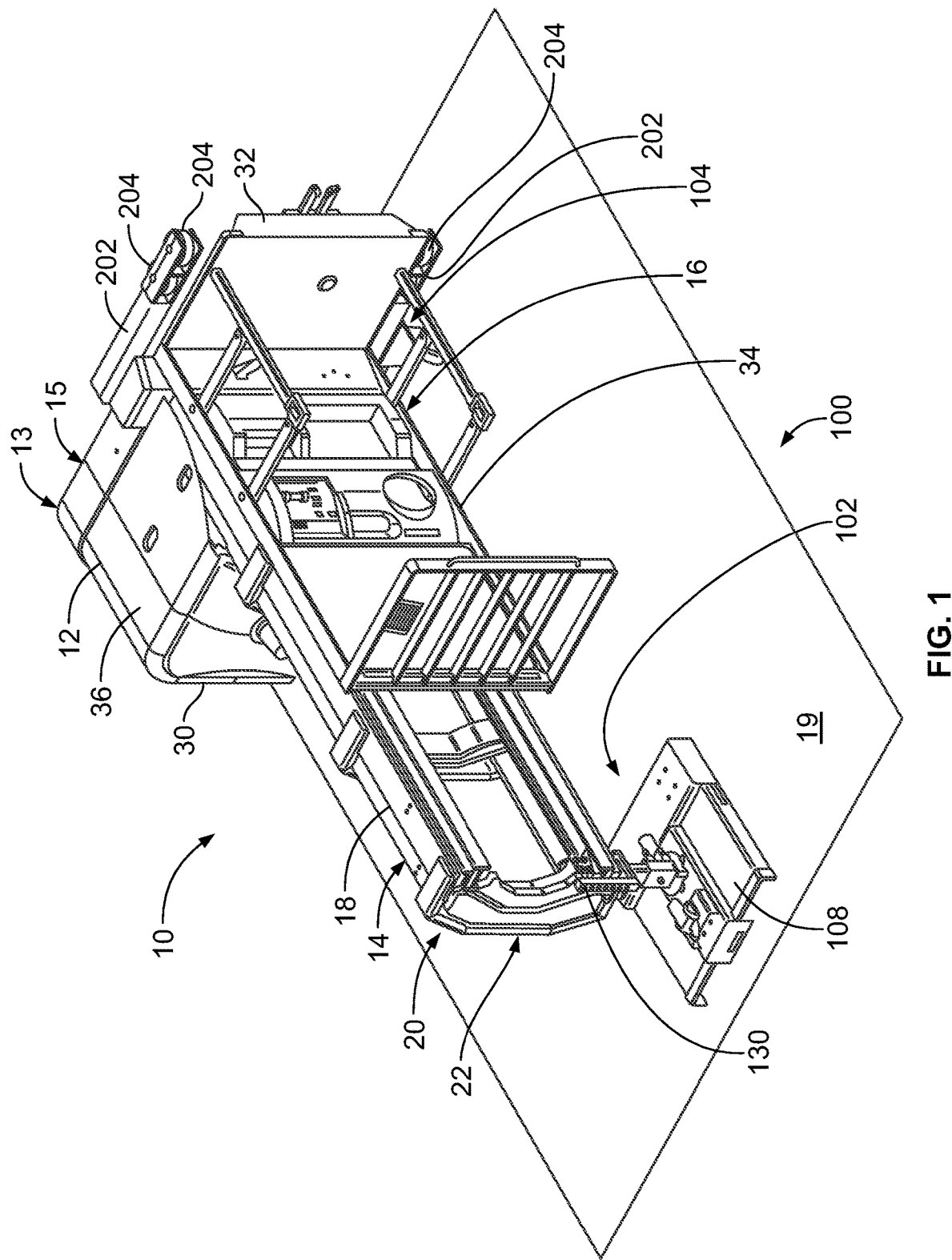
FIGS. 1 and 2 depict perspective views of an industrial vehicle supported on a layover bracket system according to one or more embodiments shown and described herein.
Figure 2:
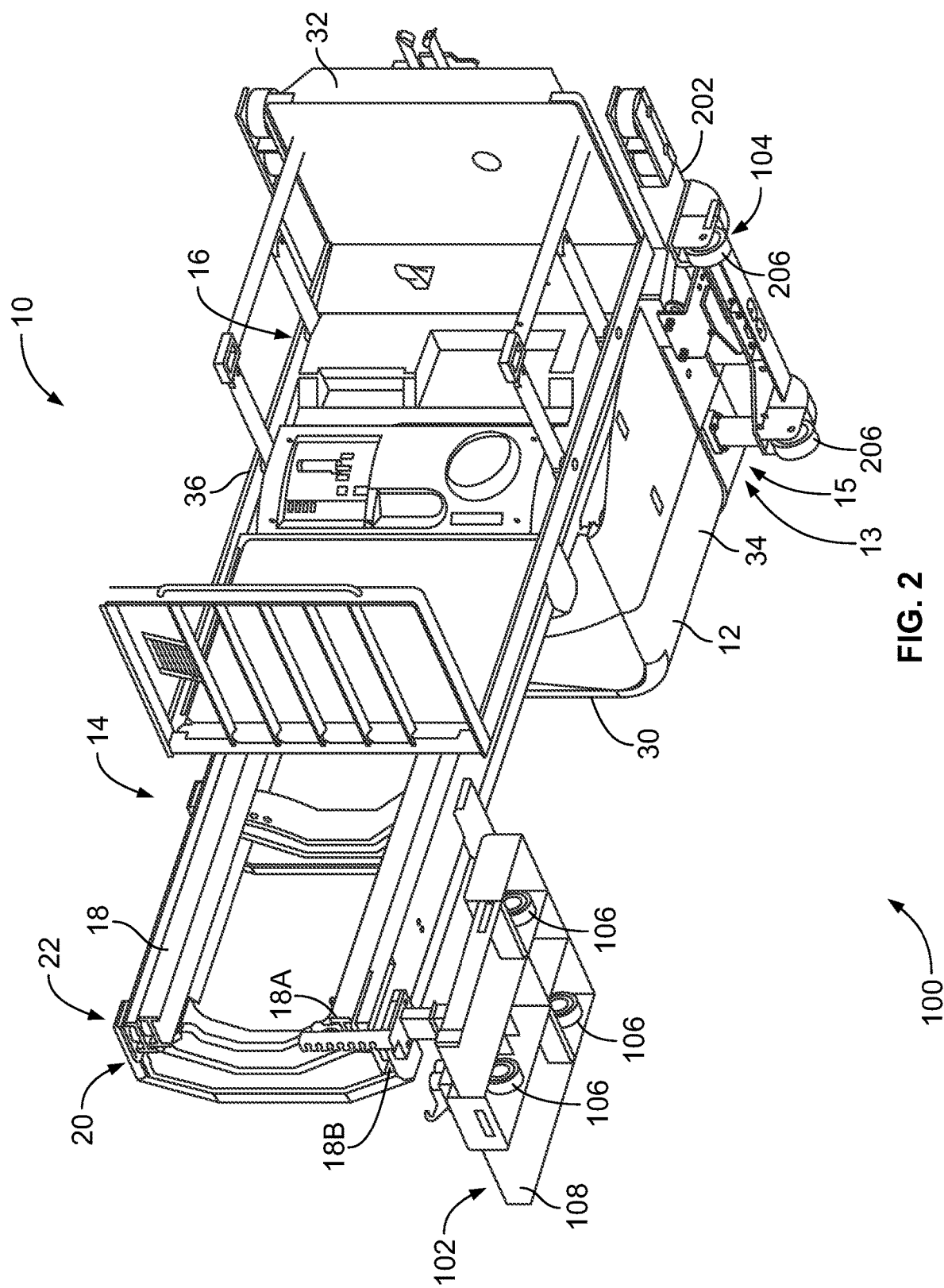

Referring to FIGS. 1 and 2, an industrial vehicle 10 (hereinafter "vehicle 10") is shown. According to embodiments, the vehicle 10 is a forklift truck, but the invention disclosed herein may be used with any suitable type of industrial vehicle. The vehicle 10 includes a power unit 12 and a load handling assembly 14. The power unit 12 includes traditional components, as will be apparent to those having original skill in the art, which components will not be described in detail herein. A proximal end portion 13 of the vehicle 10 is defined by a lower portion 15 of the power unit 12 adjacent to the floor surface 19 when the vehicle 10 is in an upright and vertical position.

According to embodiments, the load handling assembly 14 includes a man-up operator compartment 16 having traditional controls and features, as will be apparent to those having original skill in the art, which controls and features will not be described in detail herein. The load handling assembly 14 also includes a mast assembly 18 for raising and lowering the operator compartment 16. According to embodiments, the mast assembly 18 may comprise one or more mast sections for raising the operator compartment 16 to associated heights. A distal end portion 20 of the vehicle 10 depicted in FIGS. 1 and 2 is defined by an upper portion 22 of the mast assembly 18. According to embodiments, the load handling assembly 14 may also or alternately comprise a fork carriage assembly 23 (FIG. 12) and one or more forks, where the fork carriage assembly is movable along the mast assembly in a known manner.

According to embodiments, the vehicle 10 includes a front side 30 facing away from the load handling assembly 14, a back side 32 opposite to the front side 30, a left side 34 between the front and back sides 30, 32, and a right side 36 between the front and back sides 30, 32 and opposite to the left side 34.

The vehicle 10 is depicted in a horizontal or laid over position in FIGS. 1 and 2. A layover bracket system 100 (hereinafter "system 100") is used to support the vehicle 10 on the floor surface 19 while the vehicle 10 is in the horizontal position and comprises a support bracket 102 and a layover bracket 104. The support bracket 102 is removably coupled to the distal end portion 20 (i.e., to the upper portion 22 of the mast assembly 18 according to embodiments) of the vehicle 10 on either side of the vehicle 10. The layover bracket 104 is separate from the support bracket 102 and is removably coupled to the proximal end portion 13 of the vehicle 10 on the same chosen side of the vehicle 10 as the support bracket 102.

Discussing the support bracket 102 and layover bracket 104 in turn, the support bracket 102 includes at least one wheel, and preferably multiple wheels, such as the one or more wheels 106 as shown in FIG. 2. The support bracket 102 further comprises a base portion 108 that may serve to protect the one or more wheels 106 from damage. The one or more wheels 106 are provided for moving the system 100 with the vehicle 10 supported thereon while the vehicle 10 is in the horizontal position, as will be discussed in greater detail herein. According to embodiments, the wheels 106 may be spaced apart from one another to provide maximum support for the vehicle 10 while in the horizontal position, such as in the triangular pattern as shown in FIG. 2. It is contemplated that the support bracket 102 may comprise any number of wheels 106. For example, if the support bracket 102 were to include more than three wheels 106, such as four wheels 106, the wheels 106 may be arranged in a square or rectangular pattern. If the support bracket 102 were to have only two wheels 106, those wheels 106 may be spaced apart along a common, lateral axis 24 (FIG. 3) of the base portion 108. If the support bracket 102 were to have only one wheel 106, that wheel 106 may be positioned directly underneath a second component 132 of the support bracket 102, to be discussed below.

Figure 3:
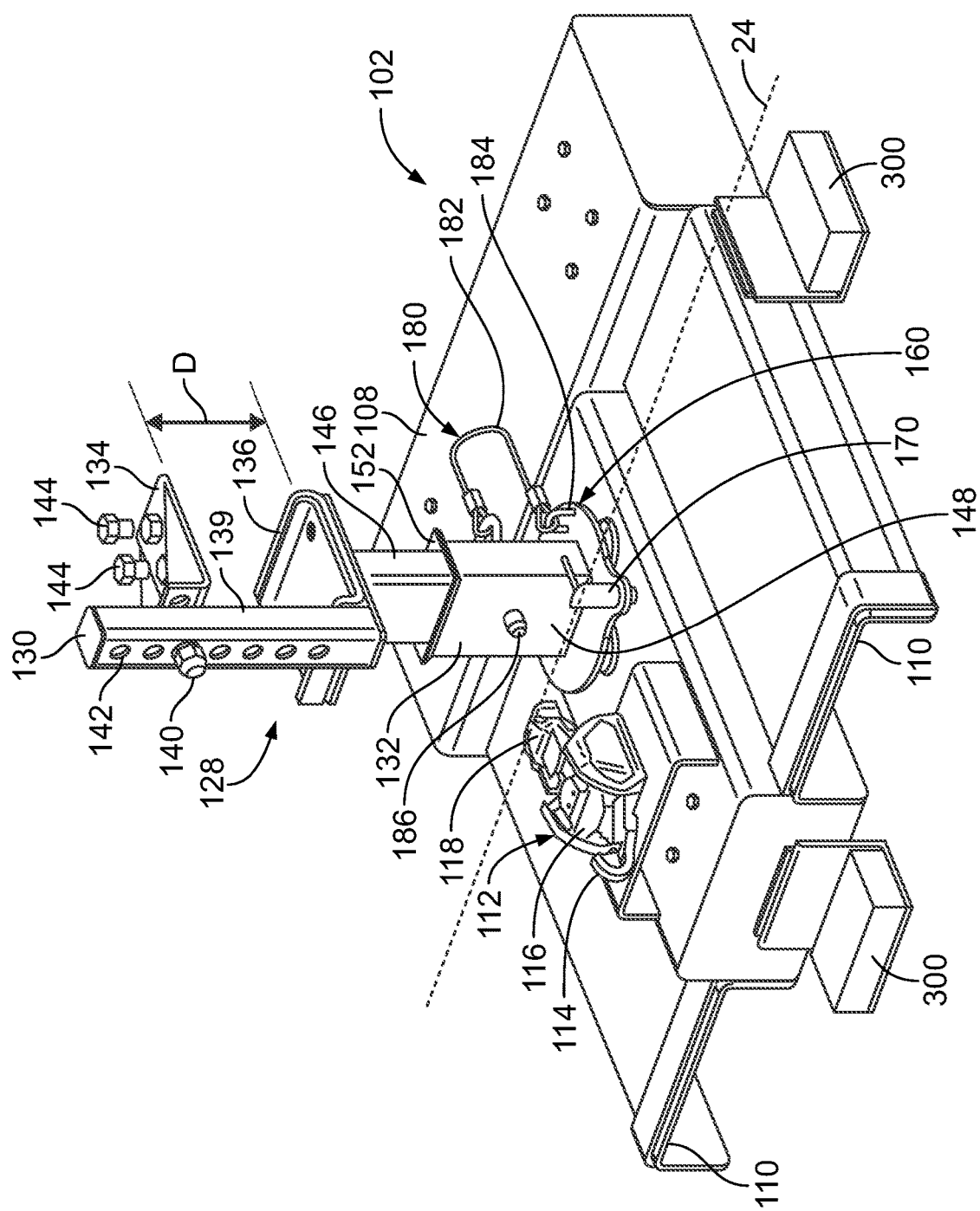
FIG. 3 depicts a perspective view of a support bracket of the layover bracket system according to one or more embodiments shown and described herein.

With reference to FIG. 3, the base portion 108 includes a pair of fork pockets 110 for receiving forks of a tow vehicle (not shown) such as, for example, a materials handling vehicle that is provided to move the vehicle 10 on the system 100. The base portion 108 further includes a tow mechanism 112 to enable the system 100 and the vehicle 10 supported on the system 100 to be removably coupled to the tow vehicle (not shown) such that extraction from a location, such as from within a semi-trailer, box car, or storage space is facilitated. In other words, the fork pockets 110 allow a tow vehicle to push the system 100 and vehicle 10, and the removable coupling of the tow mechanism 112 to the tow vehicle allows for the tow vehicle to pull the vehicle 10. The tow mechanism 112 includes a retractable hook 114 affixed to a strap (not shown) that is spooled within a housing 116. The hook 114 is removably coupled to the tow vehicle and actuation of a lever 118 is performed to retract the strap and hook 114 into the housing 116 to put tension on the strap and couple the system 100 and the tow vehicle. Examples of the tow mechanism 112 include a flat hook strap tie-down, a ratchet tie down, a nylon sling, a ratchet strap, a ratchet tow strap, or the like. In one embodiment, the tow vehicle may be a tow tractor and the tow mechanism 112 may be a tow hook, a hitch, a hook, a pintle hook, a lunette eye, a ball hitch, and the like types of towing couplers and straps. In this embodiment, given the rigid nature of the tow mechanism 112, the tow tractor is able to both push and pull the layover bracket system without the need of forks in the fork pockets 110.

The support bracket 102 further includes a coupling structure 128 comprising a first component 130 removably coupled to the industrial vehicle distal end portion 20 (see FIG. 1) and a second component 132 coupled to the base portion 108 and that releasably secures the first component 130 to the second component 132. The first component 130 comprises an adjustable first member 134 and a fixed second member 136 and is configured to capture and releasably secure the support bracket 102 to the industrial vehicle 10 (FIG. 1). Specifically, the first member 134 and the second member 136 are used to clamp a structure of the industrial vehicle 10 (FIG. 1) distal end portion 20 therebetween to releasably secure the support bracket 102 to the industrial vehicle 10. According to embodiments, the structure of the industrial vehicle distal end portion 20 clamped between the adjustable first member 134 and the fixed second member 136 may be one or more end portions of mast sections 18A and/or a mast cross brace 18B as shown in FIG. 2.

Figure 4:
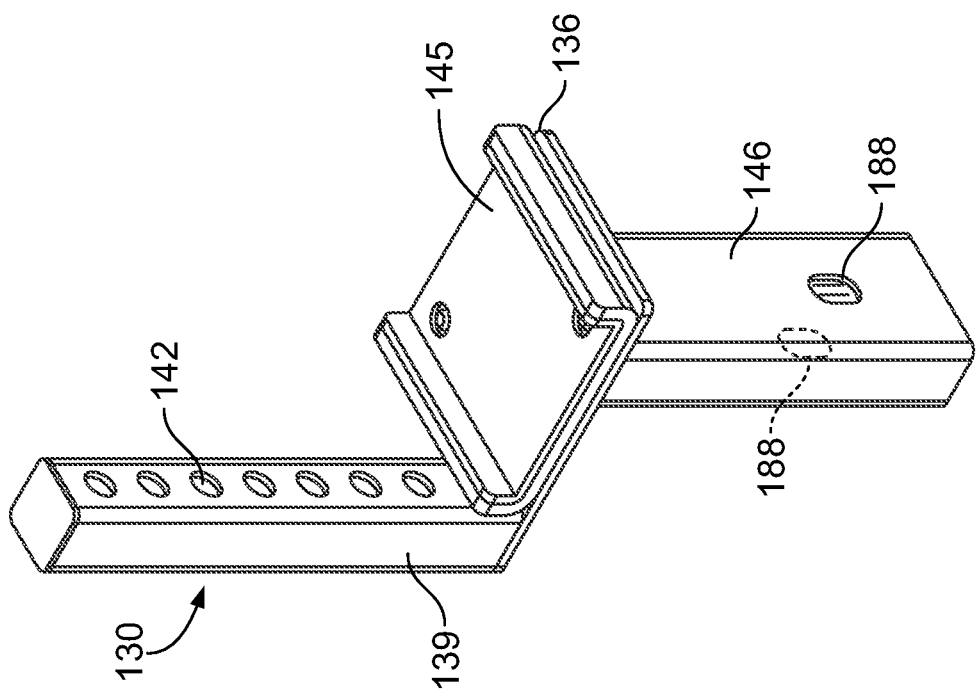

According to embodiments, the first member 134 is adjustable along the length of an elongate member 139 of the first component 130 by a bolt 140 that extends through one of a plurality of bolt holes 142 formed in the elongate member 139, see also FIG. 4. Movement of the first member 134 along the elongate member 139 allows for modifying a clamping distance D between the first member 134 and the second member 136, e.g., to allow the support bracket 102 to be used with multiple types of industrial vehicles that have different types of structures to which the coupling structure 128 is clamped. The first member 134 may also include adjustment bolts 144 to allow fine tuning of the clamping distance D between the first member 134 and the second member 136. One or both of the first member 134 and the second member 136 may include a protective pad 145 (FIG. 4) (e.g., made of plastic or other material softer than metal) over the respective inner, or clamping, surfaces of the first member 134 and the second member 136, which protective pads 145 contact the industrial vehicle distal end portion 20 (FIG. 1) to prevent damage or surface blemishes thereto. The first component 130 further includes a connection member 146 that extends from the second member 136 in a direction away from the first member 134, the connection member 146 used for releasably securing the first component 130 to the second component 132.

Figure 5:
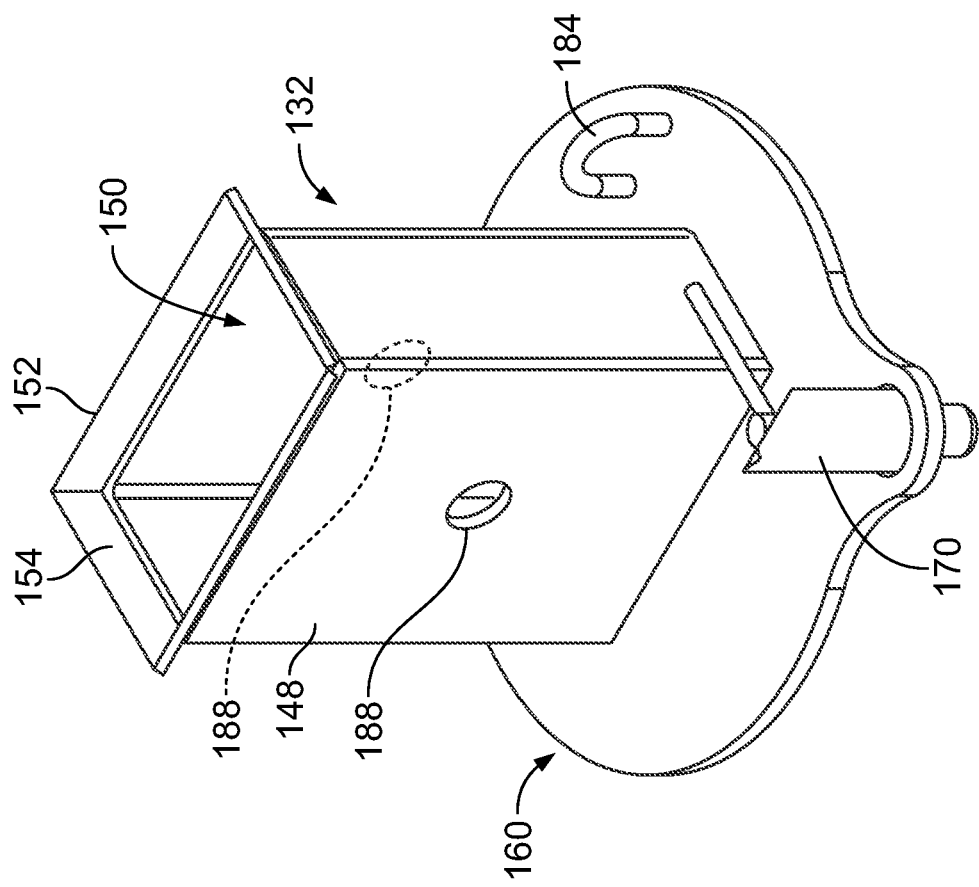
FIGS. 4 and 5 depict enlarged perspective views of respective components of the support bracket of FIG. 3.

With reference to FIGS. 3 and 5, the second component 132 includes a tubular member 148 defining an aperture 150 for receiving the connection member 146 of the first component 130. A lip 152 of the tubular member 148 that opens to the aperture 150 defines an angled surface 154, the angled surface 154 providing a landing area to guide the connection member 146 of the first component 130 into the aperture 150 in the case that the connection member 146 is not precisely aligned with the aperture 150 at the commencement of insertion of the connection member 146 into the aperture 150.

The second component 132 further includes a rotatable member 160 that rotates the coupling structure 128 relative to the base portion 108 of the support bracket 102. According to embodiments, the rotatable member 160 may be affixed to the lower end of the tubular member 148 and to the upper surface of the base portion 108, although it is contemplated that the rotatable member 160 could be located elsewhere, such as between the connection member 146 and the second member 136 of the first component 130. The rotatable member 160 permits the coupling structure 128 to rotate up to any desired angle within a 360 degree turning radius relative to the base portion 108.

A locking element 170, such as a retractable locking pin, may be coupled to the rotatable member 160 such that it can restrict the rotation of the rotatable member 160 relative to the base portion 108 (FIG. 3). The base portion 108 may have one or more locking apertures positioned at specific angles that the locking element 170 may engage and restrict the movement of the coupling structure 128 in relation to the base portion 108. For example, the one or more locking apertures may secure or restrict the coupling structure 128 at angles of 30 degrees, 45 degrees, 60 degrees, 90 degrees, and combinations thereof.

Referring to FIGS. 3 and 5, securing structure 180, such as a cable 182 affixed to an anchor 184 on the rotatable member 160 and an insertion pin 186 that is received in respective openings 188 formed in the tubular member 148 and in the connection member 146 (FIGS. 4 and 5), may be provided to releasably secure the coupling structure 128 to the second component 132, e.g., to prevent unwanted removal of the connection member 146 from the aperture 150 when the system 100 is coupled to a vehicle 10.

Figure 8:
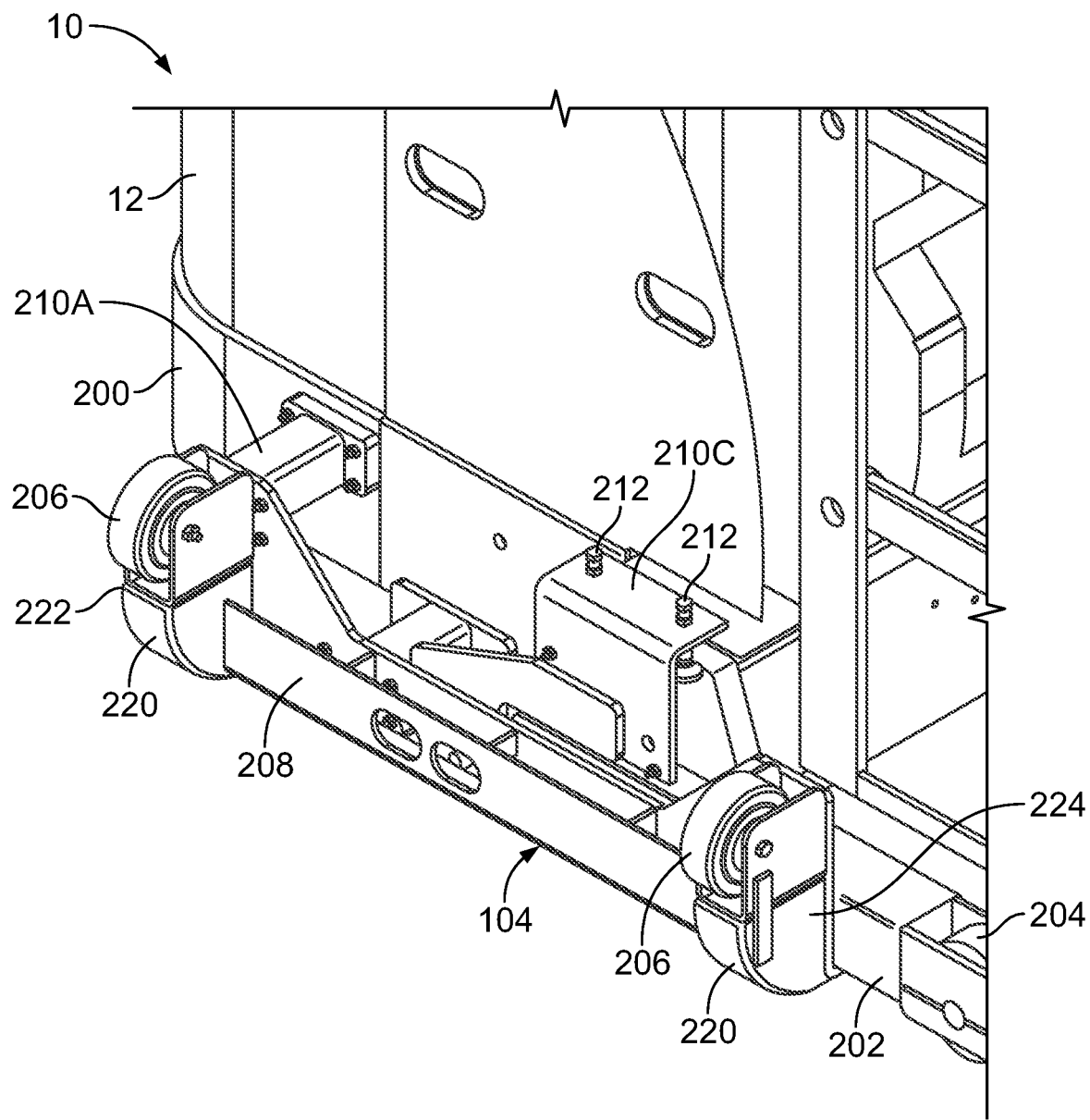
FIG. 8 depicts a perspective view of the layover bracket coupled to an industrial vehicle.

Turning now to the layover bracket 104, according to embodiments, the layover bracket 104 is removably coupled to a skirt 200 extending at least partially around the power unit 12 of the vehicle 10, see FIG. 8. Depending on the type of industrial vehicle, a portion of the layover bracket 104 may also be removably coupled to an elongate outrigger 202 extending alongside the operator compartment 16 of the vehicle 10, which outrigger 202 includes at least one load bearing wheel 204 and is a known component of an industrial vehicle of the type shown in FIGS. 1 and 2 and will not be described in further detail herein.

Figure 6:
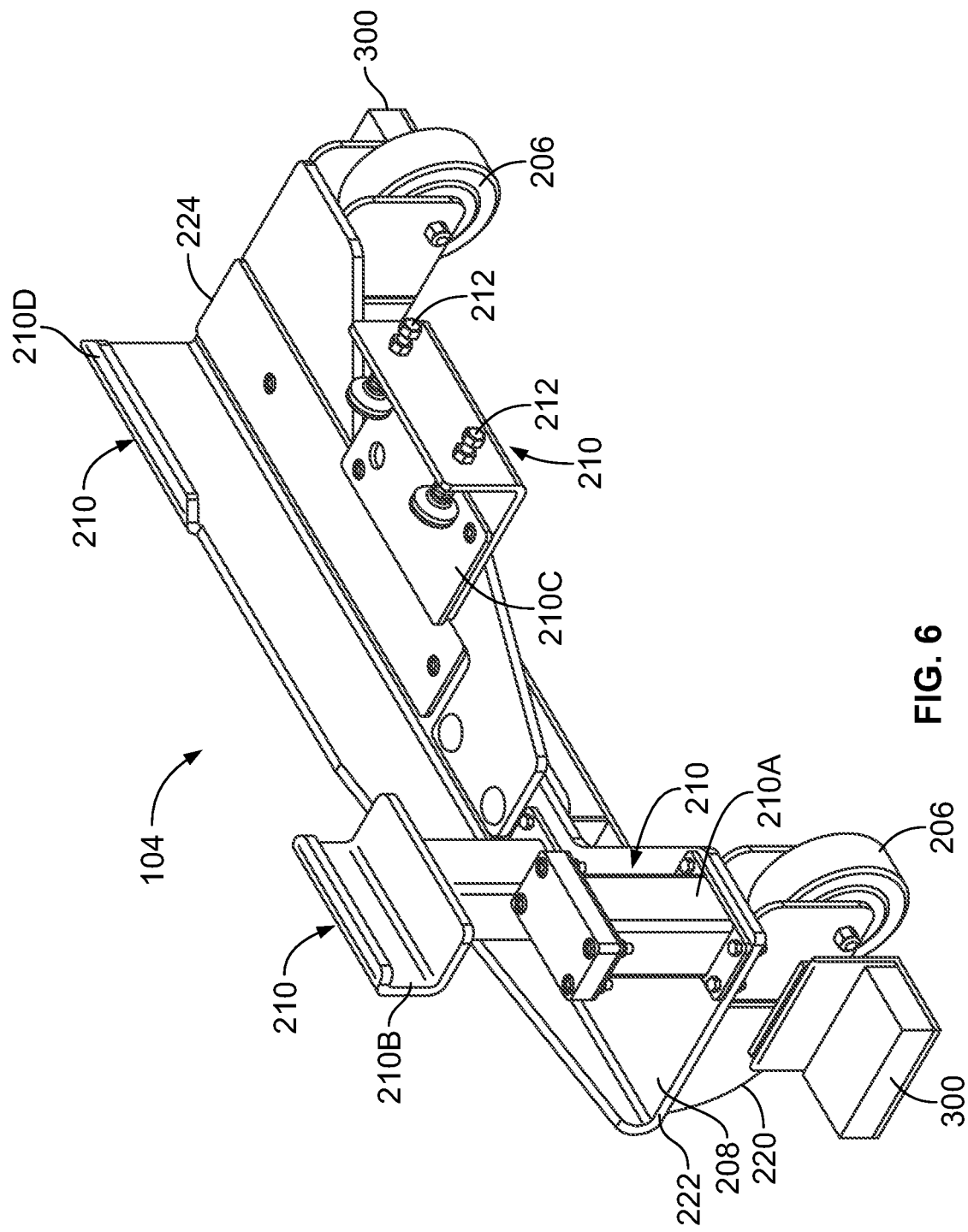
FIGS. 6 and 7 depict perspective views of a layover bracket of the layover bracket system according to one or more embodiments shown and described herein.
Figure 7:
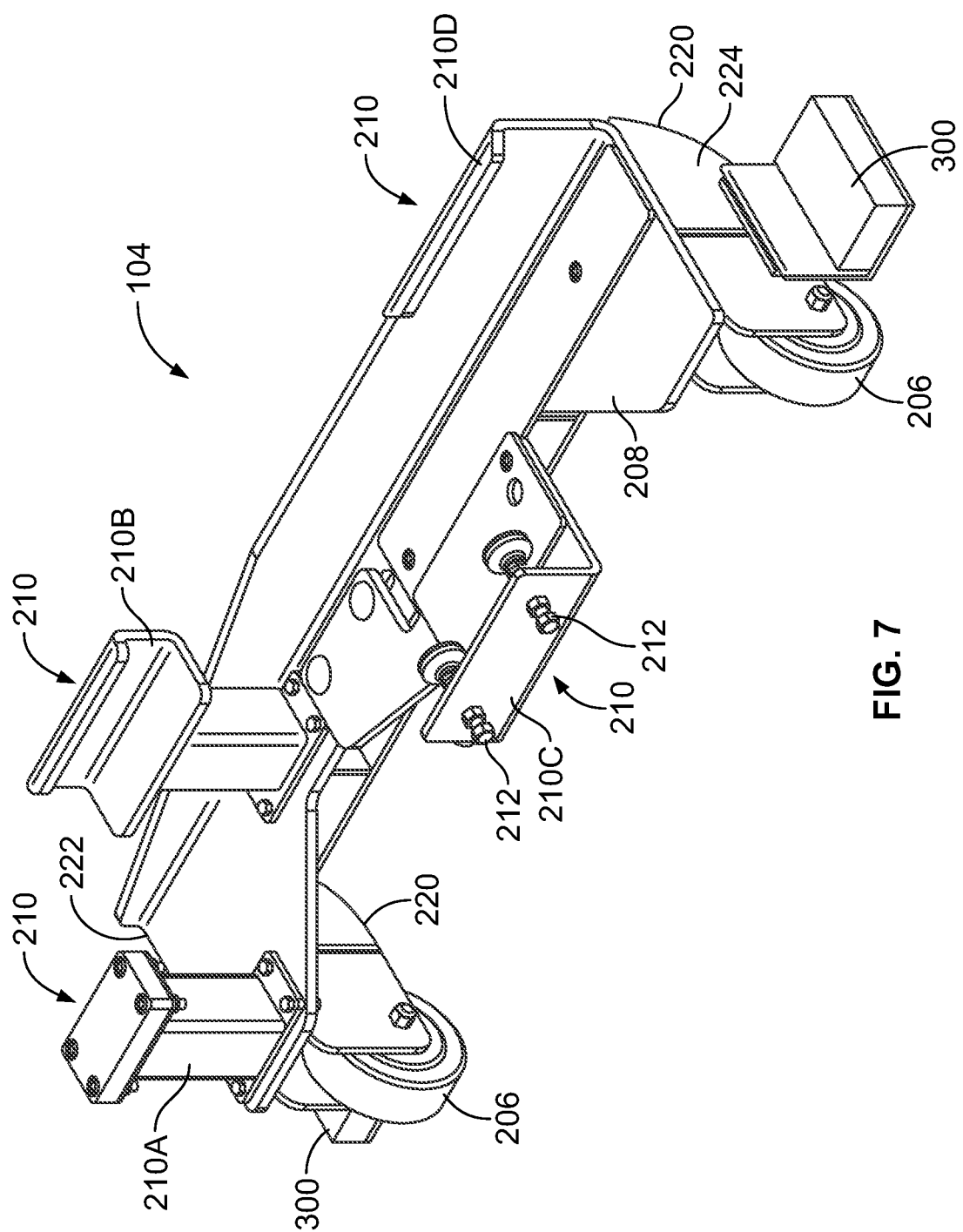

Referring now to FIGS. 6-8, the layover bracket 104 includes at least one wheel 206, and preferably multiple wheels 206, such as two wheels 206. The wheels 206 are coupled to a main body portion 208 of the layover bracket 104 and are provided for moving the system 100 with the vehicle 10 supported thereon while the vehicle 10 is in the horizontal position, as will be discussed in greater detail herein.

Figure 9:
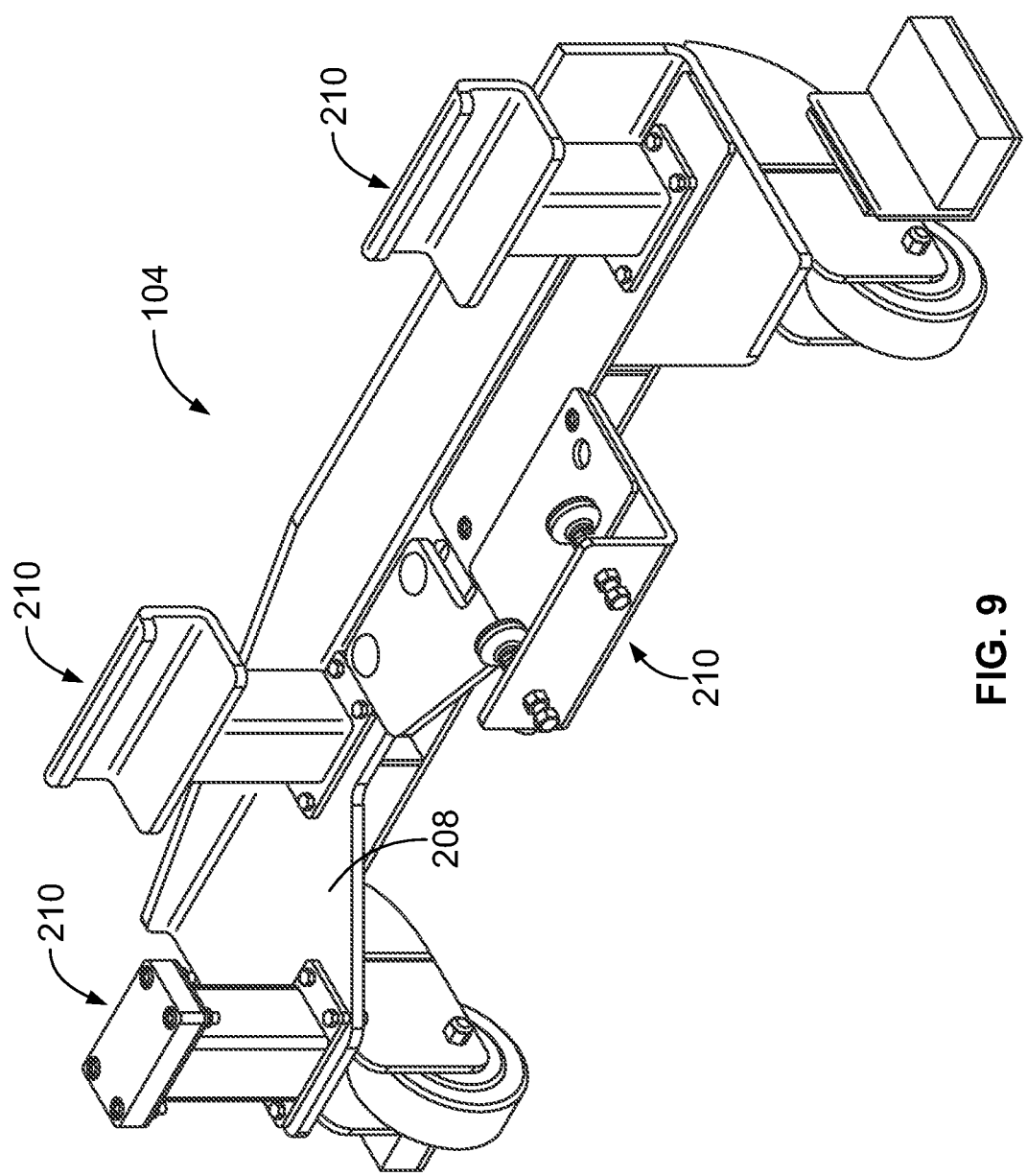
FIGS. 9 and 10 depict perspective views of alternate layover brackets according to one or more embodiments shown and described herein.
Figure 10:
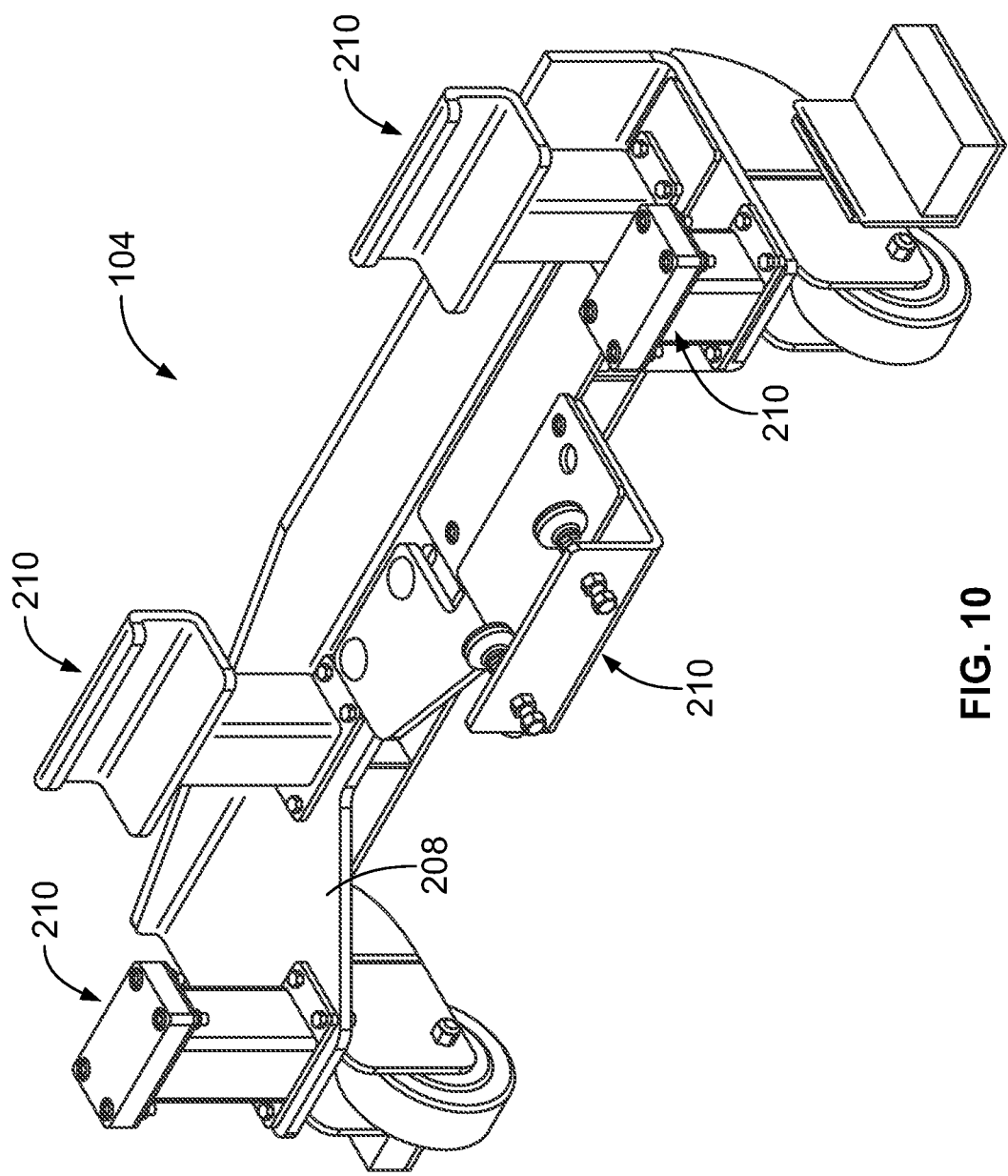

The layover bracket main body portion 208 includes one or more securing structures 210 for engaging with the structure of the vehicle 10 to releasably secure the vehicle 10 to the layover bracket 104. The securing structure 210 may include, for example, support blocks with protective pads and/or engagement lips, clamps, etc., and may be removable from the main body portion 208 and/or configurable in size, shape, length, thickness, etc., to allow the layover bracket 104 to be secured to different types of vehicles, e.g., with different types of interchangeable securing structures 210. Further, one or more of the securing structures 210 may include fastening hardware 212, such as fastening bolts that are used to clamp down on or tighten against the structure of the vehicle 10, such as the outrigger 202. The exemplary securing structures 210 illustrated in FIGS. 6-8 include: an extension block 210A with a protective pad at a distal end thereof for abutting the vehicle skirt 200; a support block 210B with an engagement lip for engaging with a lower surface of the vehicle skirt 200; a fastening structure 210C that includes fastening bolts that are used to tighten against the outrigger 202; and an engagement lip 210D for engaging with a lower surface of the outrigger 202. As noted above, the type, size, and location of the securing structure 210 can be tailored to a specific industrial truck to be supported on the system 100. Other types of exemplary securing structures 210 are illustrated in FIGS. 9 and 10, which respectively depict layover brackets 104 for use on other types of industrial vehicles or similar industrial vehicles to the one depicted in FIGS. 1 and 2 but with different structural characteristics.

The layover bracket main body portion 208 includes a curved ramp surface 220 facing away from the vehicle 10 when the layover bracket 104 is coupled to the vehicle 10. The curved ramped surface 220 provides a pivoting surface on the floor surface 19 (FIG. 1) when the vehicle 10 is moved between vertical and horizontal positions, as will be discussed in greater detail herein. More specifically, a first side end portion 222 and an opposed second side end portion 224 of the layover bracket main body portion 208 each include a curved ramp surface 220, wherein the curved ramp surface 220 of both of the first side end portion 222 and second side end portion 224 provide a pivoting surface on the floor surface 19 when the vehicle 10 is moved between vertical and horizontal positions.

Figure 14:
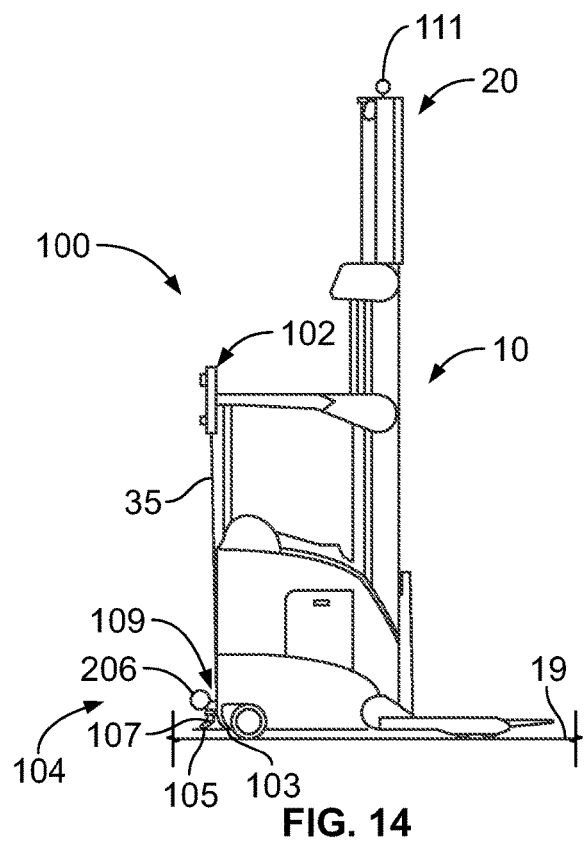
FIG. 14 depicts a perspective view of another embodiment of the layover bracket system coupled to an industrial vehicle according to one or more embodiments shown and described herein.

Referring now to FIG. 14, in one embodiment, the layover bracket 104 may comprise a hinged plate 105 coupled to the layover bracket 104 by a hinge 103 and a resistance element 107. The hinge 103 rotatably couples the hinged plate 105 to the main body portion 208 (shown in FIG. 6) and the resistance element 107 provides an increasing layover resistance force to the momentum of the vehicle 10 as it transitions between the vertical and horizontal positions and exertion force as the vehicle 10 transitions between the horizontal and vertical positions.

A hinge lock 109 may be used to releasably couple the hinged plate 105 to the main body portion 208 once the industrial vehicle 10 is near the horizontal position and/or the one or more wheels 206 are at or near making contact with the floor surface 19. The hinge lock 109 prevents the hinged plate 105 from dragging along the floor surface 19 while the industrial vehicle 10 is in the horizontal position. It is contemplated that the hinge lock 109 will lock the hinged plate 105 to the main body portion 208 automatically or manually and is released automatically or manually while the industrial vehicle 10 transitions between the horizontal and the vertical positions. The hinged lock 109 may be a spring latch, latch bolt, draw latch, cam lock, Norfolk latch, Suffolk latch, cabin hook and eyelet, toggle latch, electromagnetic lock, lock-style solenoids, and the like.

In one embodiment, the support bracket 102 and the layover bracket 104 are coupled together as one piece as indicated in FIG. 14 by a coupler 35. The coupler 35 may be removably coupled to the support bracket 102 and layover bracket 104 or they may be permanently affixed to each other. The coupler 35 may be adjustable to fit the dimension characteristics of more than one industrial vehicle 10.

In one embodiment, the support bracket 102 may not be used and instead, a second layover bracket 104 is used. It is contemplated that this will allow the layover bracket system 100 to be multi-directional in its application to the industrial vehicle 10 wherein the orientation of each bracket is not critical to laying over the industrial vehicle 10. It is contemplated that the main body portion 208 of the layover bracket 104 is high enough off of the floor surface 19 to allow a pair of forks to lift and maneuver the distal end portion 20 and proximal end portion 13. It is also contemplated that the layover bracket 104 will incorporate the tow mechanism 112 as shown in FIG. 3.

In one embodiment illustrated in FIG. 14, the industrial vehicle 10 may include attachment points 111, hooks, eyelets, etc., for the purpose of using the layover bracket system 100. It is contemplated that this will forgo any temporary attachments attached to the industrial vehicle 10 for the purpose of transitioning the industrial vehicle 10 between the vertical and horizontal positions that are later needed to be removed. The attachment points 111 are advantageous for a rental fleet of industrial vehicles 10 that are used for a duration of time and then shipped to another location.

Referring to FIGS. 3, 6, and 7, one or both of the support bracket 102 and layover bracket 104 may include blocks 300 that are used to secure the system 100 to a surface for shipping of the industrial vehicle 10. For example, the blocks 300 may be made from wood blocks and secured to the support bracket 102 and the layover bracket 104 such that the brackets 102, 104 can be nailed to the floor surface of a shipping container or trailer in which the system 100 and vehicle 10 are transported/shipped.

Referring now to FIGS. 1 and 2, a method for using the system 100 to move the industrial vehicle 10 from a vertical position to a horizontal position will now be described. While in the vertical (upright) position, where the load handling assembly 14 extends generally vertically upward, the first component 130 of the support bracket 102 is secured to the vehicle 10, e.g., at the left side 34 or right side 36 of the vehicle 10 to the distal end portion 20 by clamping the appropriate structure of the distal end portion 20 between the support bracket first member 134 and second member 136, and the layover bracket 104 is secured to the vehicle 10 at the proximal end portion 13 of the vehicle 10, e.g., to the corresponding left side 34 or right side 36 of the vehicle 10 to the skirt 200 and/or outrigger 202 using the securing structures 210. The layover bracket 104 is coupled to the proximal end portion 13 of the vehicle 10 such that the layover bracket 104 does not contact the floor surface 19 while the vehicle 10 is in the vertical position. This allows the layover bracket 104 to be coupled and uncoupled to/from the vehicle 10 without lifting the vehicle 10 off of the floor surface 19.

The vehicle 10 is then pivoted, e.g., by pushing and/or pulling the vehicle 10 at or near the distal end portion 20 in a direction to the left side 34 or right side 36 of the vehicle to which the support bracket 102 and layover bracket 104 are coupled, to begin movement of the vehicle 10 toward the horizontal position, the horizontal position is as shown in FIGS. 1 and 2. At a certain point during the pivoting of the vehicle 10, the curved ramped surfaces 220 of the layover bracket 104 contact the floor surface 19, wherein the point of contact depends on the dimensions of the vehicle 10 and of the layover bracket 104. It is contemplated that such a chosen point of contact may avoid slippage of the vehicle 10 on the floor surface 19 during the movement to the horizontal position. According to embodiments, the point of contact occurs before the center of gravity of the industrial vehicle 10 is over the center of the layover bracket 104. Alternatively, the point of contact occurs when the load handling assembly 14 of the vehicle 10 is about 30 degrees relative to vertical.

Once the vehicle 10 approaches the horizontal position, the connection member 146 of the support bracket first component 120 is guided into the aperture 150 of the second component tubular member 148, which is resting on the floor surface 19. Referring to FIGS. 3, 4, and 5, the lip 152 of the tubular member 148 and the rotatable member 160 are used as needed to aid in the insertion of the connection member 146 into the aperture 150 to complete the movement of the vehicle 10 to the horizontal position. After the first component 130 of the support bracket 102 is secured to the second component 132, i.e., by the aperture 150 receiving the connection member 146, separational movement between the first and second components 130, 132 can be prevented using the securing structure 180, and rotation of the second component 130 relative to the base portion 108 can be prevented as desired using the locking element 170.

In the horizontal position, the support bracket 102 and layover bracket 104 are coupled to either the left side 34 or right side 36 of the vehicle 10 that faces the floor surface 19 when the vehicle 10 is supported on the system 100. In this position, the support bracket 102 and layover bracket 104 support the distal end portion 20 and proximal end portion 13 of the vehicle 10, respectively, and the wheels 106, 206 of the respective support bracket 102 and layover bracket 104 allow the system 100 and the vehicle 10 to roll across the floor surface 19. According to embodiments, the wheels 106, 206 are large enough to traverse docking plates and other floor surface 19 imperfections (e.g., expansion joints, damaged surface, and the like).

The system 100 also allows the vehicle 10 to be moved from a horizontal position to a vertical position taking opposite steps to those described above for moving the vehicle 10 from a vertical position to a horizontal position.

As noted above, FIGS. 9 and 10 depict alternate versions of the layover bracket 104, e.g., for use on different types of vehicles or vehicles having different configurations than that shown in FIGS. 1 and 2. While not all configurations of the one or more securing structures 201 are shown, those shown exemplify the differing positions and heights they can take. It should be noted that the main body portion 208 is shown as a single configuration but multiple configurations are contemplated to properly position the one or more securing structures 210 to the particular industrial vehicle 10 application.

Figure 11:
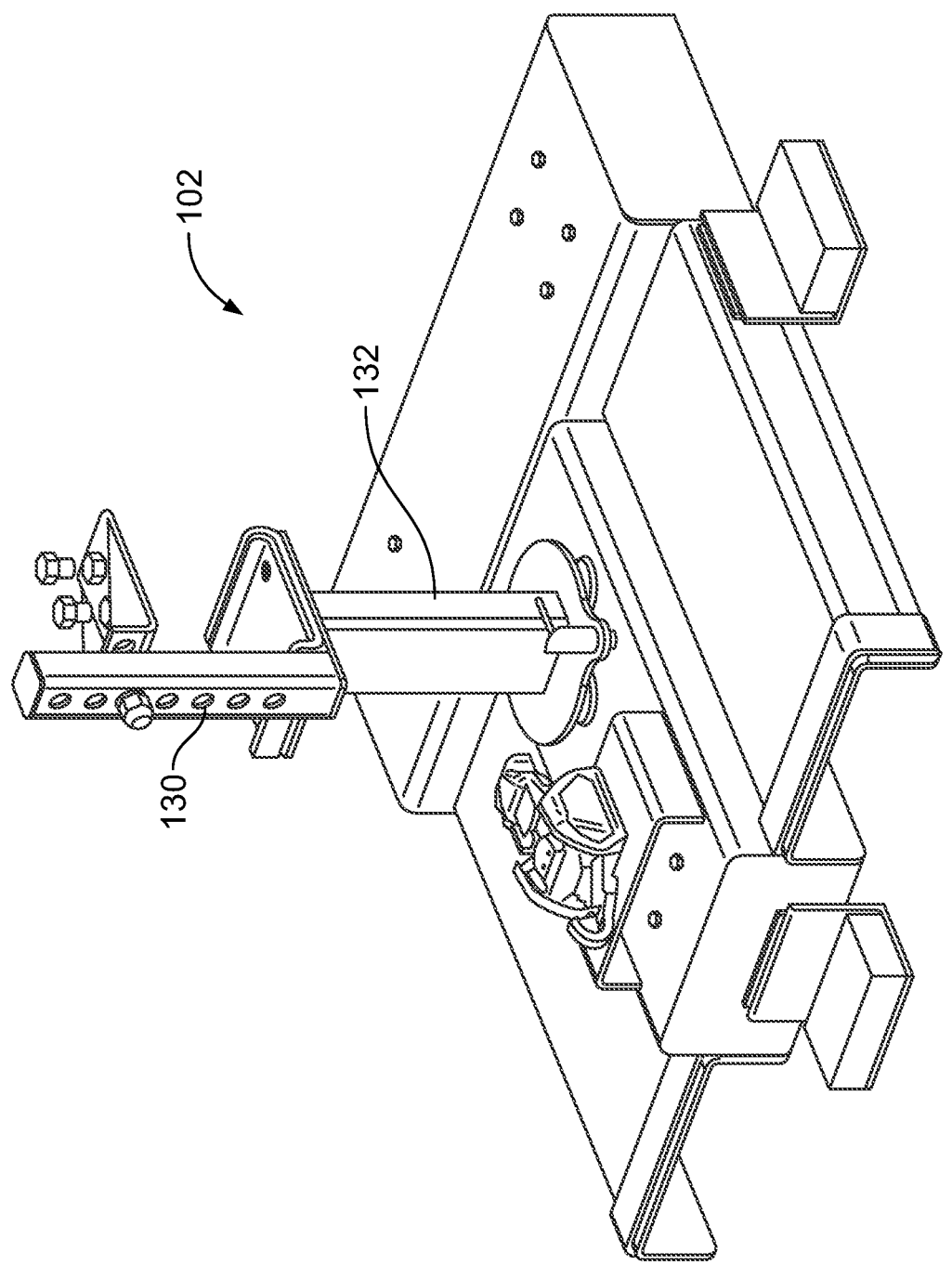
FIG. 11 depicts a perspective view of an alternate support bracket according to one or more embodiments shown and described herein.

FIG. 11 depicts a support bracket 102 where the first component 130 and second component 132 are combined into a single, integral piece. Under this arrangement, the entire support bracket 102 may be removably coupled to the industrial vehicle distal end portion 20 to use the associated system for moving an industrial vehicle between vertical and horizontal positions.

Figure 12:
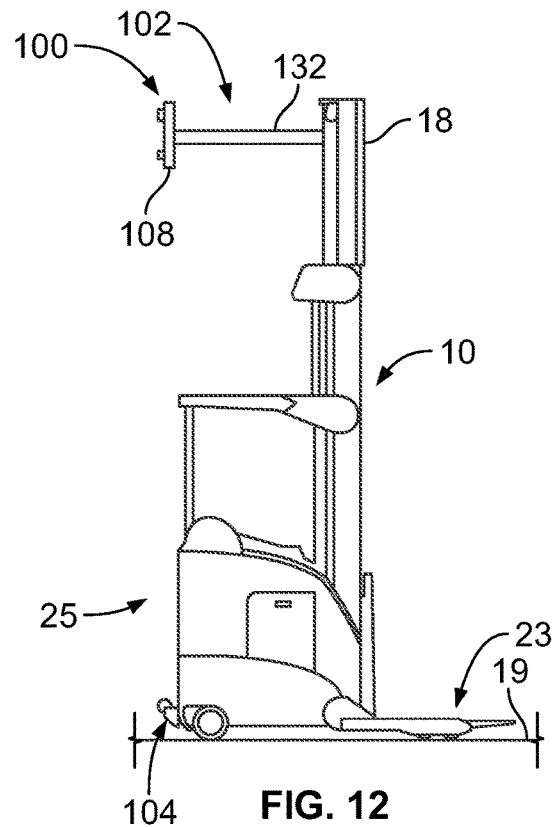
FIG. 12 depicts a perspective view of another embodiment of the layover bracket system coupled to an industrial vehicle according to one or more embodiments shown and described herein.
Figure 13:
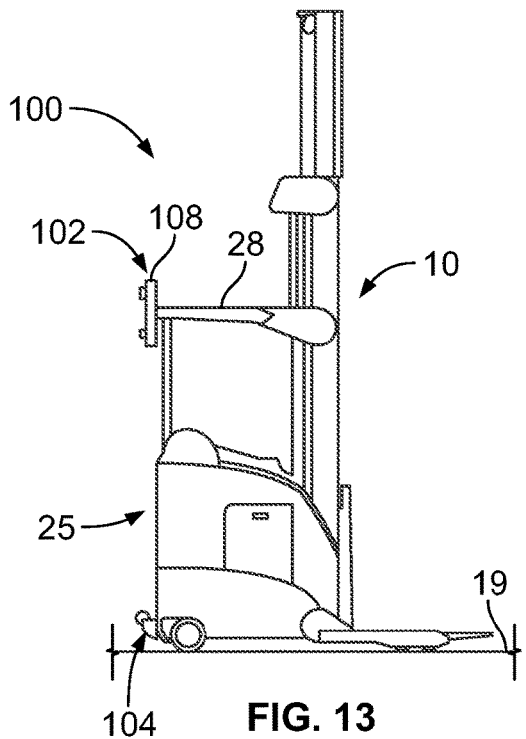
FIG. 13 depicts a perspective view of another embodiment of the layover bracket system coupled to an industrial vehicle according to one or more embodiments shown and described herein.

FIGS. 12 and 13 depict another type of industrial vehicle 10 that can be supported by the system 100. In this embodiment, the layover bracket system 100 is coupled to the back 25 of the industrial vehicle 10 and the industrial vehicle 10 is shown in the vertical position as opposed to FIGS. 1 and 2 where the industrial vehicle 10 is shown in the horizontal position. In FIG. 12, the second component 132 of the support bracket 102 is coupled to the mast assembly 18 and has a longer length than previously shown to accommodate the vehicle 10 at an about level orientation when in the horizontal position. In FIG. 13, the support bracket 102 is coupled directly to an overhead guard 28 of the industrial vehicle 10.

Figure 15:
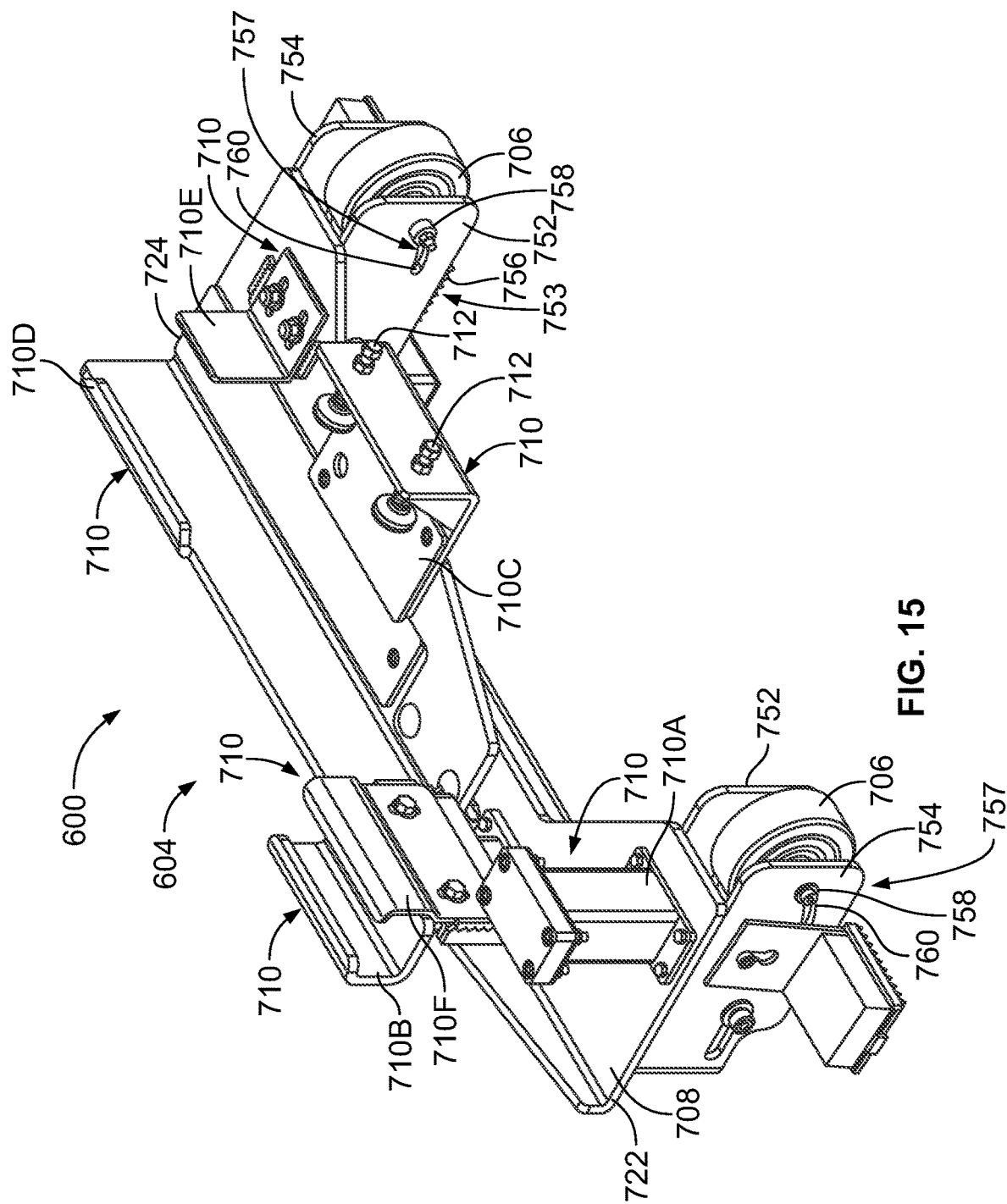
FIG. 15 depicts a perspective view of another embodiment of a layover bracket of the layover bracket system.

FIG. 15 depicts another embodiment of a layover bracket 604 of a layover bracket system 600, wherein structure similar to that described above with reference to the embodiments of FIGS. 1-14 includes the same reference number increased by 500. While the layover bracket system 600 according to this embodiment is disclosed as being used with the vehicle 10, it may be used with any type of vehicle disclosed herein. The support bracket of the layover bracket system 600 may be the same as any of the support brackets 102 described herein.

The layover bracket 604 has a main body portion 708 that includes one or more securing structures 710 for engaging with the structure of the vehicle 10 to releasably secure the vehicle 10 to the layover bracket 604. The securing structure 710 may include, for example, support blocks with protective pads and/or engagement lips, clamps, etc., and may be removable from the main body portion 708 and/or configurable in size, shape, length, thickness, etc., to allow the layover bracket 604 to be secured to different types of vehicles, e.g., with different types of interchangeable securing structures 710. Further, one or more of the securing structures 710 may include fastening hardware, such as fastening bolts 712 that are used to clamp down on or tighten against the structure of the vehicle 10, such as the outrigger 202. The exemplary securing structures 710 illustrated in FIG. 15 include: an extension block 710A with a protective pad at a distal end thereof for abutting the vehicle skirt 200; a support block 710B with an engagement lip for engaging with a lower surface of the vehicle skirt 200; a fastening structure 710C that includes fastening bolts 712 that are used to tighten against the outrigger 202; an engagement lip 710D for engaging with a lower surface of the outrigger 202; a securing L-bracket 710E to prevent the operator compartment 16 of the vehicle 10 from traversing a mast section during transit, e.g., by resting on top of a floor portion of the operator compartment; and a top bracket 710F that interacts up with the support block 710B to clamp a structural member 750 of the vehicle 10 (see FIG. 16) to prevent the vehicle 10 from detaching from the layover bracket 604. Both sides of the support block 710B and of the top bracket 710F may include a die-lock strip of teeth to militate against any slippage of support block 710B and the top bracket 710F, once clamped together, see FIG. 15.

Figure 16:
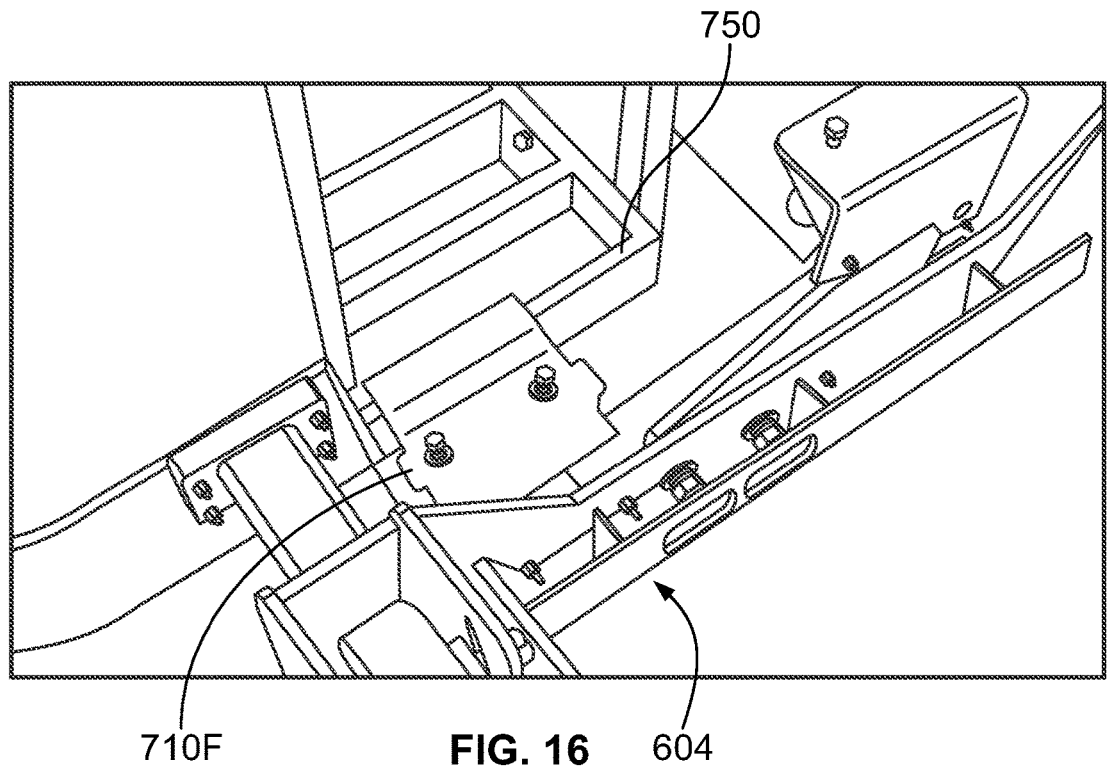
FIG. 16 depicts a partial perspective view of the layover bracket of FIG. 15 coupled to an industrial vehicle.

FIG. 16 depicts the top bracket 710F of the layover bracket 604 in an installed position. The top bracket 710F is shown engaging the structural member 750 of the vehicle 10. The top bracket 710F, in conjunction with the support block 710B clamps part of the structural member 750.

As shown in FIG. 15, the layover bracket 604 includes at least one wheel 706, and preferably multiple wheels 706, such as two wheels 706. The wheels 706 are coupled to the main body portion 708 of the layover bracket 604. Each wheel 706 is mounted between respective inner side wheel plates 752 and outer side wheel plates 754. The layover bracket 604 may further include at least one retention member 753 comprising at least one serrated plate 756, and preferably multiple serrated plates 756, such as two serrated plates 756, one positioned in proximity to each wheel 706, e.g., positioned between respective inner side and outer side wheel plates 752, 754. The serrated plates 756 can be used to contact the floor surface 19 during use of the layover bracket system 600 while the vehicle 10 is in an upright position to militate against sliding movement of the layover bracket system 600 and vehicle 10 on the floor surface 19.

In order to engage/disengage the serrated plate(s) 756 from the floor surface 19, the wheels 706 each have an adjustment mechanism 757 comprising a screw 758 that is received in respective semi-circular slots 760 located in the inner and outer wheel plates 752, 754. The adjustment mechanism 757 allows the wheels 706 to be moved between a ground-engaging position and a retracted position as desired. For example, when the vehicle 10 is in a laid over position and is to be moved on the layover bracket system 600, the wheels 706 may be in the ground-engaging positions, e.g., to engage the floor surface 19, as shown in FIG. 15, allowing the layover bracket system 600 with the vehicle 10 to roll freely on the floor surface 19. When the vehicle 10 is in an upright position, the wheels 706 may be in the retracted positions, e.g. retracted inside of the inner and outer wheel plates 752, 754 so as to not contact the floor surface 19. When the wheels 706 are in the retracted positions, this allows the serrated plate(s) 756 to make contact with the floor surface 19, thereby militating against slippage of the layover bracket system 600 with the vehicle 10 on the floor surface 19.

Figure 17:
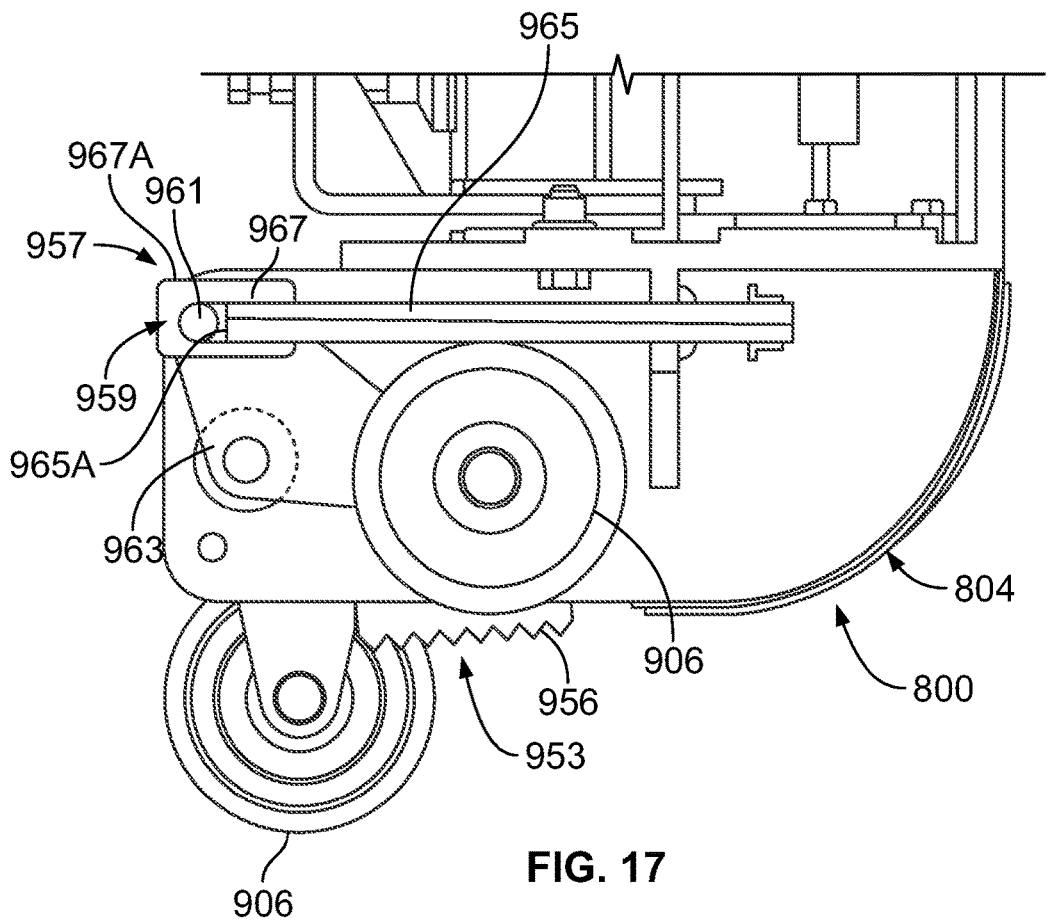
FIG. 17 depicts a side elevational view of one wheel of another embodiment of a layover bracket.

FIG. 17 depicts an alternate adjustment mechanism 957, wherein structure similar to that described above with reference to the embodiment of FIGS. 15 and 16 includes the same reference number increased by 200. Only the structure in FIG. 17 that is different than the structure in the embodiment of FIGS. 15 and 16 will be described herein for FIG. 17.

According to this embodiment, each wheel 906 of the layover bracket 804 can be pivoted between the ground-engaging position (the wheel in the background in FIG. 17 is shown in the ground-engaging position) and the retracted position (the wheel in the foreground in FIG. 17 is shown in the retracted position, noting that, in use, both wheels would be in the same position as one another), or at any position between the ground engaging position and the retracted position, depending on the amount of ground clearance needed, via a pivot mechanism 959 comprising a pivot pin 961 and a pivot plate 963. A locking member comprising an electronically or mechanically actuated rod 965 is removably inserted into a U-shaped receiving member 967 to lock the wheel 906 in the retracted position, as shown in the wheel 906 in the foreground in FIG. 17. The locking member is also used to lock the wheel 906 in the ground-engaging position by way of an end surface 965A of the rod 965 abutting an outer surface 967A of the U-shaped receiving member 967, which member 967 pivots with the pivot mechanism as the wheel 906 is moved between ground-engaging and retracted positions.

The current method of shipping tall industrial vehicles, such as forklifts, is to lay them on their side, on a large wooden pallet. Such pallets are expensive, are time consuming to build, and can only be moved on over-the-road semi-trucks or flatbed two-ton trucks when empty, or else be destroyed, usually at a cost. The system 100 disclosed herein eliminates the need for such pallets, and also greatly enhances the movement of the vehicles between vertical (upright) and horizontal (laying down) positions. Further efficiency is realized in that the system 100 is able to stay coupled to the vehicle 10 during transport/shipment, allowing the system to be used to unload the vehicle 10 from a shipping container when a destination is reached, and then to move the vehicle from the horizontal (shipping) position, to its normal vertical (upright) position. Moreover, even further efficiency is realized in that the industrial vehicle 10 can still be moved about the floor surface 19 with the system 100, 600 attached. This is advantageous to allow the industrial vehicle 10 to not only be stored in an industrial environment (e.g, warehouse, etc.) in the vertical position and take up less floor space, but to still be used as intended. For example, the industrial vehicle 10 with the system 100, 600 attached can be shipped to a location, used for a short duration of time, and subsequently shipped again, without removing the system 100, 600 from the vehicle 10

It is contemplated that the features of each of the described embodiments may be interchangeable, such that multiple embodiments are contemplated and are not limited to only those shown.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that the terms "generally", "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Certain terminology is used in the disclosure for convenience only and is not limiting. The words "left", "right", "front", "back", "upper", and "lower" designate directions in the drawings to which reference is made. The terminology includes the words noted above as well as derivatives thereof and words of similar import.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A layover bracket system for supporting an industrial vehicle in a horizontal position comprising:
    a support bracket removably coupled to a distal end portion of the industrial vehicle, the support bracket including at least one wheel for moving the layover bracket system with the industrial vehicle supported thereon while the industrial vehicle is in a horizontal position; and
    a layover bracket, separate from the support bracket, the layover bracket removably coupled to a proximal end portion of the industrial vehicle such that the layover bracket does not contact the floor surface while the industrial vehicle is in a vertical position, the layover bracket including at least one wheel for moving the layover bracket system with the industrial vehicle supported thereon while the industrial vehicle is in the horizontal position;
    wherein the support and layover brackets support the distal and proximal end portions of the industrial vehicle, respectively, when the industrial vehicle is in a horizontal position and allow the layover bracket system and industrial vehicle to roll on the at least one wheel of the support and layover brackets.

2. The system of claim 1, wherein:
    the industrial vehicle includes a load handling assembly, a front side facing away from the load handling assembly, a back side opposite to the front side, a left side between the front and back sides, and a right side between the front and back sides and opposite to the left side; and the support bracket is removably coupled to the industrial vehicle distal end at one of the left or right sides thereof, such that the one of the left or right sides of the industrial vehicle faces the floor surface when the industrial vehicle is supported on the layover bracket system.

3. The system of claim 2, wherein the distal end portion is defined on a mast assembly of the industrial vehicle.

4. The system of claim 1, wherein the support bracket includes a pair of fork pockets for receiving forks of a materials handling vehicle that are provided to move the industrial vehicle on the layover bracket system.

5. The system of claim 1, wherein the support bracket includes a first component removably coupled to the industrial vehicle distal end portion and a second component that releasably secures the first component to the second component.

6. The system of claim 5, wherein the second component includes a rotatable member that rotates relative to a base portion of the support bracket.

7. The system of claim 6, wherein the second component includes an aperture for receiving the first component, wherein a lip of the second component that opens to the aperture defines an angled surface.

8. The system of claim 1, wherein the layover bracket is removably coupled to a skirt extending at least partially around a power unit of the industrial vehicle.

9. The system of claim 8, wherein:
the industrial vehicle includes a load handling assembly, a front side facing away from the load handling assembly, a back side opposite to the front side, a left side between the front and back sides, and a right side between the front and back sides and opposite to the left side; and
the layover bracket is removably coupled to the skirt at one of the left or right sides of the industrial vehicle, such that the one of the left or right sides of the industrial vehicle faces the floor surface when the industrial vehicle is supported on the layover bracket system.

10. The system of claim 1, wherein the layover bracket is removably coupled to:
a skirt extending at least partially around a power unit of the industrial vehicle; and
an outrigger extending alongside an operator compartment of the industrial vehicle.

11. The system of claim 1, wherein:
the layover bracket includes a curved ramp surface facing away from the industrial vehicle when the layover bracket is coupled to the industrial vehicle; and
when the industrial vehicle is moved from a vertical position to the horizontal position, the curved ramp surface provides a pivoting surface on the floor surface.

12. The system of claim 11, wherein opposed first and second side end portions of the layover bracket each include a curved ramp surface, wherein the curved ramp surface of both of the first and second side end portions provide a pivoting surface on the floor surface when the industrial vehicle is moved from a vertical position to the horizontal position.

13. The system of claim 1, wherein the support bracket includes a tow mechanism.

14. The system of claim 1, wherein the layover bracket includes at least one retention member for militating against sliding movement of the layover bracket system and the vehicle on the floor surface when the vehicle is engaged with the layover bracket and is in an upright position.

15. The system of claim 14, wherein the layover bracket further includes an adjustment mechanism for moving the at least one wheel between a ground-engaging position and a retracted position, wherein:
while the at least one wheel is in the ground engaging position, the at least one wheel contacts the floor surface while the vehicle is supported on the layover bracket and is in the horizontal position; and
while the at least one wheel is in the retracted position, the at least one retention member contacts the floor surface while the vehicle is engaged with the layover bracket and is in the upright position, but the at least one wheel does not contact the floor surface while the vehicle is engaged with the layover bracket and is in the upright position.

16. A layover bracket system for supporting an industrial vehicle in a horizontal position comprising:
a bracket removably coupled to a proximal end portion of the industrial vehicle, the proximal end portion located proximate to the floor surface when the industrial vehicle is in a vertical position, the bracket comprising:
at least one wheel for moving the layover bracket system with the industrial vehicle supported thereon while the industrial vehicle is in a horizontal position;
at least one retention member for militating against sliding movement of the layover bracket system and the vehicle on the floor surface when the vehicle is engaged with the bracket and is in an upright position; and
an adjustment mechanism for moving the at least one wheel between a ground-engaging position and a retracted position, wherein:
while the at least one wheel is in the ground engaging position, the at least one wheel contacts the floor surface while the vehicle is supported on the bracket and is in the horizontal position; and
while the at least one wheel is in the retracted position, the at least one retention member contacts the floor surface while the vehicle is engaged with the bracket and is in the upright position, but the at least one wheel does not contact the floor surface while the vehicle is engaged with the bracket and is in the upright position.

17. The system of claim 16, wherein the bracket is removably coupled to a skirt extending at least partially around a power unit of the industrial vehicle.

18. The system of claim 17, wherein:
the industrial vehicle includes a load handling assembly, a front side facing away from the load handling assembly, a back side opposite to the front side, a left side between the front and back sides, and a right side between the front and back sides and opposite to the left side; and
the bracket is removably coupled to the skirt at one of the left or right sides of the industrial vehicle, such that the one of the left or right sides of the industrial vehicle faces the floor surface when the industrial vehicle is supported on the layover bracket system.

19. The system of claim 16, wherein the bracket is removably coupled to:
a skirt extending at least partially around a power unit of the industrial vehicle; and
an outrigger extending alongside an operator compartment of the industrial vehicle.

20. The system of claim 16, wherein opposed first and second side end portions of the bracket each include a curved ramp surface, wherein the curved ramp surface of both of the first and second side end portions provide a pivoting surface on the floor surface when the industrial vehicle is moved from a vertical position to the horizontal position.

21. The system of claim 16, wherein the bracket is coupled to the proximal end portion of the industrial vehicle such that the bracket does not contact the floor surface while the industrial vehicle is in a vertical position.

22. The system of claim 16, wherein the bracket further comprises:
a curved ramp surface facing away from the industrial vehicle when the bracket is coupled to the industrial vehicle;
wherein:
when the industrial vehicle is moved from the vertical position to the horizontal position, the curved ramp surface provides a pivoting surface on the floor surface; and
the bracket supports the proximal end portion of the industrial vehicle
when the industrial vehicle is in the horizontal position and allows the layover bracket system and industrial vehicle to roll on the at least one wheel of the bracket.

23. A layover bracket system for supporting an industrial vehicle in a horizontal position comprising:
a support bracket removably coupled to a distal end portion of the industrial vehicle, the support bracket including:
at least one wheel for moving the layover bracket system with the industrial vehicle supported thereon while the industrial vehicle is in a horizontal position; and
a pair of fork pockets for receiving forks of a materials handling vehicle that are provided to move the industrial vehicle on the layover bracket system; and
a layover bracket, separate from the support bracket, the layover bracket removably coupled to a proximal end portion of the industrial vehicle, the layover bracket including at least one wheel for moving the layover bracket system with the industrial vehicle supported thereon while the industrial vehicle is in the horizontal position;
wherein the support and layover brackets support the distal and proximal end portions of the industrial vehicle, respectively, when the industrial vehicle is in a horizontal position and allow the layover bracket system and industrial vehicle to roll on the at least one wheel of the support and layover brackets.

24. The system of claim 23, wherein the support bracket includes a first component removably coupled to the industrial vehicle distal end portion and a second component that releasably secures the first component to the second component.

25. The system of claim 24, wherein the second component includes a rotatable member that rotates relative to a base portion of the support bracket.

26. The system of claim 25, wherein the second component includes an aperture for receiving the first component, wherein a lip of the second component that opens to the aperture defines an angled surface.

27. The system of claim 23, wherein:
the layover bracket includes a curved ramp surface facing away from the industrial vehicle when the layover bracket is coupled to the industrial vehicle; and
when the industrial vehicle is moved from a vertical position to the horizontal position, the curved ramp surface provides a pivoting surface on the floor surface.

28. The system of claim 27, wherein opposed first and second side end portions of the layover bracket each include a curved ramp surface, wherein the curved ramp surface of both of the first and second side end portions provide a pivoting surface on the floor surface when the industrial vehicle is moved from a vertical position to the horizontal position.

29. The system of claim 23, wherein the layover bracket includes at least one retention member for militating against sliding movement of the layover bracket system and the vehicle on the floor surface when the vehicle is engaged with the layover bracket and is in an upright position.

30. The system of claim 29, wherein the layover bracket further includes an adjustment mechanism for moving the at least one wheel between a ground-engaging position and a retracted position, wherein:
while the at least one wheel is in the ground engaging position, the at least one wheel contacts the floor surface while the vehicle is supported on the layover bracket and is in the horizontal position; and
while the at least one wheel is in the retracted position, the at least one retention member contacts the floor surface while the vehicle is engaged with the layover bracket and is in the upright position, but the at least one wheel does not contact the floor surface while the vehicle is engaged with the layover bracket and is in the upright position.

* * * * *